US011901602B2

(12) United States Patent
Wagner et al.

(10) Patent No.: US 11,901,602 B2
(45) Date of Patent: Feb. 13, 2024

(54) DIELECTRIC WAVEGUIDE CABLE HAVING A TUBULAR CORE WITH AN INNER SURFACE COATED BY A HIGH PERMITTIVITY DIELECTRIC

(71) Applicant: HUBER+SUHNER AG, Herisau (CH)

(72) Inventors: Martin Wagner, Steinach (CH); Andrea Croce, Legnano (IT); Ulf Hügel, Herisau (CH)

(73) Assignee: HUBER+SUHNER AG, Herisau (CH)

( * ) Notice: Subject to any disclaimer, the term of this patent is extended or adjusted under 35 U.S.C. 154(b) by 157 days.

(21) Appl. No.: 17/416,836

(22) PCT Filed: Dec. 11, 2019

(86) PCT No.: PCT/EP2019/084547
§ 371 (c)(1),
(2) Date: Jun. 21, 2021

(87) PCT Pub. No.: WO2020/126717
PCT Pub. Date: Jun. 25, 2020

(65) Prior Publication Data
US 2022/0123450 A1 Apr. 21, 2022

(30) Foreign Application Priority Data
Dec. 21, 2018 (CH) .................................... 01598/18

(51) Int. Cl.
*H01P 3/16* (2006.01)

(52) U.S. Cl.
CPC ..................................... *H01P 3/16* (2013.01)

(58) Field of Classification Search
CPC ........................................................ H01P 3/16
USPC .......................................................... 333/239
See application file for complete search history.

(56) References Cited

U.S. PATENT DOCUMENTS

| | | | |
|---|---|---|---|
| 4,216,449 | A | 8/1980 | Kach |
| 4,441,091 | A | 4/1984 | Nishida et al. |
| 4,463,329 | A | 7/1984 | Suzuki |
| 4,875,026 | A | 10/1989 | Walter et al. |
| 5,963,700 | A | 10/1999 | Kato et al. |

(Continued)

FOREIGN PATENT DOCUMENTS

| | | | |
|---|---|---|---|
| EP | 0 304 141 | A2 | 2/1989 |
| EP | 3 306 740 | A1 | 4/2018 |

(Continued)

OTHER PUBLICATIONS

Van Thienen, N., et al., "A Multi-Gigabit CPFSK Polymer Microwave Fiber Communication Link in 40 mm CMOS," in IEEE Journal of Solid-State Circuits, Aug. 2016, vol. 51, No. 8, pp. 1952-1958 (20 pp.) doi: 10.1109/JSSC.2016.2580605.

(Continued)

*Primary Examiner* — Benny T Lee
(74) *Attorney, Agent, or Firm* — Pauley Erickson & Swanson

(57) ABSTRACT

A dielectric wave guide cable (1) includes a tubular core (2) made from a low loss material having a certain permittivity. The tubular core (2) is encompassed by a cladding (3) having, compared to the tubular core (2), a lower permittivity. The tubular core (2) may be coated on the inside by a coating (3) having a higher permittivity. The cladding (3) may be encompassed by a jacket (4).

15 Claims, 2 Drawing Sheets

(56) References Cited

U.S. PATENT DOCUMENTS

| | | | | |
|---|---|---|---|---|
| 2008/0025680 | A1* | 1/2008 | Sun et al. .......... | G02B 6/02033 385/125 |
| 2017/0077581 | A1 | 3/2017 | Nickel et al. | |
| 2017/0170539 | A1 | 6/2017 | Morgan et al. | |
| 2018/0040936 | A1* | 2/2018 | Yoshimoto et al. .. | H01P 11/006 |
| 2019/0067776 | A1 | 2/2019 | Bae et al. | |

FOREIGN PATENT DOCUMENTS

| | | | |
|---|---|---|---|
| EP | 3 389 133 | A1 | 10/2018 |
| KR | 10-2017-0112901 | A | 10/2017 |
| WO | WO 2015/180850 | A1 | 12/2015 |
| WO | WO 2018/063342 | A1 | 4/2018 |

OTHER PUBLICATIONS

EPO (Riswijk, NL), English language version of the International Search Report, Form PCT/ISA/210, for International Application PCT/EP2019/084547, dated Apr. 9, 2020 (3 pages).

* cited by examiner

DIELECTRIC WAVEGUIDE CABLE HAVING A TUBULAR CORE WITH AN INNER SURFACE COATED BY A HIGH PERMITTIVITY DIELECTRIC

CROSS REFERENCE TO RELATED APPLICATION

This application is a National Phase filing in the United States, under 35 USC § 371, of PCT International Patent Application PCT/EP2019/084547, filed on 11 Dec. 2019 which claims the priority of Swiss Patent Application CH 01598/18, filed 21 Dec. 2018.

These applications are hereby incorporated by reference herein in their entirety and is made a part hereof, including but not limited to those portions which specifically appear hereinafter.

BACKGROUND OF THE INVENTION

Field of the Invention

The present invention relates to dielectric waveguide cable for transmitting of electromagnetic waves for high speed data transmission between two devices in the range of gigahertz.

Discussion of Related Art

EP3306740A1 (WO18068914A1), first published in April 2018 on behalf of Rosenberger Hochfrequenztechnik GmbH, relates to a dielectric waveguide cable. The dielectric waveguide cable includes a first dielectric core of tubular or solid shape and a second dielectric in which air is included. The first dielectric is designed for confinement of the transmitted electromagnetic waves and has a first permittivity. The second dielectric at least partially surrounds the first dielectric and is designed for spatially limiting the electromagnetic waves. It has a second permittivity which is lower than the first permittivity. The invention further relates to a transmission method for a signal. The general principle is known from U.S. Pat. No. 4,463,329 which also describes a dielectric waveguide with a solid dielectric core surrounded by a dielectric containing air.

EP3389133A1 (WO18188838A1) was first published in October 2018 in the name of Rosenberger Hochfrequenztechnik GmbH. It relates to a dielectric waveguide cable, in particular, for use in the automotive sector. The dielectric waveguide cable is having a first dielectric and a second dielectric and a separating layer which is formed between the first dielectric and the second dielectric.

U.S. Pat. No. 4,463,329A was first published in July 1984 in the name of Junkosha Co. Ltd. It describes a dielectric waveguide in cable form fabricated from polytetrafluoroethylene. The cable is a composite of partially sintered PTFE and sintered and unsintered expanded PTFE arranged in such a fashion that the specific gravity of cable decreases from the core to the outer surface. The dielectric waveguide either uses step-varying or continuously-varying dielectric constant PTFE materials.

US Patent No. 2017170539 A1 was first published in June 2017 in the name of TE Connectivity Ltd. It relates to a dielectric waveguide for propagating electromagnetic signals. The waveguide includes a cladding and an electrically conductive shield. The cladding has a body composed of a first dielectric material. The body defines a core region that is filled with a second dielectric material different than the first dielectric material. The cladding further includes at least two ribs extending from an outer surface of the body to distal ends. The shield engages the distal ends of the ribs and peripherally surrounds the cladding such that air gaps are defined radially between the outer sur-face of the body and an interior surface of the shield.

WO2015180850A1 (US 2017/077581 A) was first published in December 2015 in the name of Spinner GmbH. The publication relates to a flexible and twistable terahertz waveguide assembly which has a flexible waveguide with waveguide flange connectors at ends thereof. The flexible waveguide comprises a segmented tube of a plurality of tube segments which are connected to each other. The tube encloses a dielectric waveguide which is held by means of threads at the center of the tube. The individual segments are tiltable and/or pivotable against each other, allowing bending and twisting of the waveguide cable.

WO2018063342A1 was first published in April 2018 in the name of Aleksandar Aleksov and relates to a method of making a waveguide comprising extruding a first dielectric material as a hollow waveguide core comprising air. An outer layer is coextruded with the waveguide core, wherein the outer layer is arranged around the wave-guide core.

U.S. Pat. No. 4,216,449 was first published in July 1978 on behalf of BBC Brown Boveri and Cie. It relates to a waveguide for the transmission of electromagnetic energy which has a low attenuation even with a small line cross-section. The waveguide comprises an electromagnetically shielded hollow cylinder consisting of a substance having a low permittivity, wherein in the interior a dielectric wire of a substance having a high permittivity is disposed. An $E_{0m}$-wave (m=1, 2, 3 . . . , circular H field) is excited in the dielectric wire and the dimensioning of the dielectric wire is such (depending on the permittivities of the two substances and the particular operating frequency) that a TEM wave develops at least substantially in the space in the dielectric hollow cylinder. In the simplest case, the electromagnetic shield can consist of a metal tube and the dielectric hollow cylinder can consist primarily of air. Furthermore, the $E_{0m}$ wave excited in the dielectric wire is preferably the $E_{01}$ wave ($TM_{01}$ mode).

EP0304141 (U.S. Pat. No. 4,875,026) was first published in February 1989 in the name of WL Gore and Associates Ing. It relates to a dielectric waveguide for the transmission of electromagnetic waves. The dielectric waveguide comprises a core of polytetrafluoroethylene (PTFE), one or more layers of PTFE cladding overwrapped around the core, a mode suppression layer of an electromagnetically lossy material covering the cladding and an electromagnetic shielding layer covering the mode suppression layer. The mode suppression layer is preferably a tape of carbon-filled PTFE. Another electromagnetically lossy material layer may be placed around the shield to absorb any extraneous energy.

SUMMARY OF THE INVENTION

Continuously increasing demand for more economical solutions offering high speed data transmission between devices interconnected by network cables has pushed engineers searching for alternatives to expensive glass optical fiber (FO) transmission. Usually for shorter cable length, cooper based cables were the primary choice. However, with data rates moving toward 100 Gbit/s and beyond, the complexity, power consumption and cost of such systems approaches the fiber optic level.

Progress in semiconductor technologies, especially in miniaturization of silicon CMOS (Complementary Metal- Oxide-Semiconductor) nowadays allows builds of fully integrated transceivers with signal transmission in the range of wave lengths in the range of millimeters (mm) and beyond. At these wave lengths it becomes of interest to use dielectric waveguide cables confining and thereby guiding the radiated electro-magnetic signal by a higher permittivity compared to the surrounding air. The field energy distribution in and around such waveguides can be described using Bessel-Functions showing a field energy decay over the radius outside of the core. Unfortunately, such cable transmission gets significantly impaired when the surrounding air is distorted, for instance by contact with any solid material. To avoid such impairment, it would be possible to use a core material with higher permittivity surrounded by a larger outer cladding layer with lower permittivity, so the main field portion will propagate in the core and the field energy in the cladding layer material will decrease with the diameter ending ideally with hardly zero percentage of the transmitted field energy outside of the cladding.

To be sure that the desired propagation is not disturbed by surrounding materials or fields, the diameter of the cladding layer material has to be designed sufficiently large. A typical single mode optical fiber (SMF) for operation at 1550 nm wavelength typically has a core diameter of 9 μm surrounded by a cladding having a diameter of about 125 μm having a lower permittivity. In the mm-wave range (e.g. 130 GHZ equates 2.3 mm) the wavelength are about factor 1000 larger compared to the fiber optical wave-length (e.g. 1550 nm), so it is desired to have a large difference between the dielectric constant of the core and the surrounding material, as in this case the field will decay much faster and smaller cables can be realized. Furthermore, field confinement in the core improves the ability of the cable to guide the electromagnetic wave under bending conditions of the cable. Another approach to reduce the cable diameter and still avoiding relevant field energy portion of the transmitted signal outside of the cable is to use an outer electrically conductive shielding layer. If this electrically conductive shielding layer is metallic having a good conductivity, other undesired higher wave-guide modes can propagate, thereby causing serious multi-mode interference distortion of the signal. Therefore, the better choice would be a shielding layer with poor conductivity suppressing the undesired waveguide modes by resistive attenuation. But the more field energy from the desired mode reaches the outer dissipation layer the more energy is withdrawn from the signal transmission resulting in an increased loss.

Bending of dielectric waveguide cables is always a critical subject, because the propagating electromagnetic field carrying the signal tends to propagate on a straight line, some electromagnetic field energy will exit the cable in the bend and so leading to high losses. Acceptable bending radius of dielectric waveguide cables is tightly related to the largest wavelength of the transmitted signal (e.g., within a transmission band of 110 GHz to 140 GHz the free space wavelength of the lower band edge of 110 GHz is 2.7 mm). In the literature (e.g., A Multi-Gigabit CPFSK Polymer Microwave Fiber Communication Link in 40 nm CMOS Niels Van Thienen, Student Member, IEEE, Wouter Volkaerts, Member, IEEE, and Patrick Reynaert, Senior Member, IEEE—IEEE JOURNAL OF SOLID-STATE CIRCUITS, VOL. 51, NO. 8, August 2016) it is shown that by restricting a curvature radius to at least 15 to 20 times the wavelength, it is possible to avoid excessive leakage of the electromagnetic field. Thin cables with good guiding properties can achieve better results, up to 7.5 to 10 wavelength bending radii, allowing for example in the 110-140 GHz band 2 cm to 3 cm radii instead of 4 cm to 6 cm radii. This may be relevant when the available space is critical and it becomes therefore relevant to bend the cable on a smaller radius.

Compared to fiber optic cable with attenuation values of about 1 dB/km, attenuation at mm-waves is a serious issue. Depending on the dissipation factor of the materials guiding relevant electromagnetic energy portion of the transmitting signal, attenuation typically varies between 2 dB/m and 5 dB/m and may even reach more than 50 dB/m. The latter values occur when trying to reduce cable diameter by higher electromagnetic field confinement using higher permittivity core material. Polymer materials show a disproportional increase of the dissipation factor with increasing permittivity. The second critical parameter (at higher data rates becomes the most critical parameter) for mm-wave and sub-mm-wave DWG transmission is the signal dispersion generated from material dispersion and waveguide dispersion. Compared thereto material dispersion for low loss polymer material is typically negligible.

One object of the invention is to design a dielectric waveguide cable for the transmission of sub-mm-wave lengths, e.g., in the range of 110 to 140 GHz, offering the possibility of small outer diameters in the range of 4 mm or less in combination of comparable low attenuation (e.g., less than 5 dB/m) in the full band and comparable low dispersion (e.g., group delay variation less than 4 pico sec/m).

In the literature the research work primarily focuses on polymer waveguide with basically two types of cores, namely solid cores or hollow tube cores build from polymer materials with higher permittivity surrounded by at least one outer cladding layer made from material having a thereto compared lower permittivity. Both core types can have a rectangular cross section which would better support linear polarization transmission, or with a round cross section which provides good results for circular polarized transmission.

Unless otherwise stated, the term “permittivity” as applied herein normally means the absolute permittivity, i.e., the measure of capacitance that is encountered when forming an electric field in a particular medium. More specifically, permittivity describes the amount of charge needed to generate one unit of electric flux in a particular medium. Accordingly, a charge will yield more electric flux in a medium with low permittivity than in a medium with high permittivity. Permittivity is the measure of the ability of a material to store an electric field in the polarization of the medium. The lowest possible permittivity is that of a vacuum. The permittivity of a dielectric medium is often represented by the ratio of its absolute permittivity to the absolute permittivity of vacuum. This dimensionless quantity is called the medium’s relative permittivity, sometimes also called “permittivity”. Relative permittivity is also commonly referred to as the “dielectric constant”, a term which has been deprecated in physics and engineering as well as in chemistry.

A tubular core as described hereinafter in more detail offers the advantage of significant lower loss compared to dielectric waveguides as known from the prior art, because a lower portion of the electromagnetic field energy is traveling in the higher permittivity polymer material with high dissipation factor. The disadvantage of a hollow tube is usually significant higher waveguide dispersion and significant less field confinement increasing the needed outer diameter of the cable.

Inspired by the work at terahertz frequencies, where the field is confined by electronic bandgap structure realized by cylindrically periodic structures of altering high and low permittivity material (EBG waveguide) one aspect of the present invention is to provide a band gap structure with significant smaller dimensions to confine the field with only a comparably small field portion propagating in the high permittivity (and high dissipation factor) polymer.

One embodiment of a dielectric wave guide cable comprises a tubular core made from a low loss material, such as e.g., Polytetrafluoroethylene (PTFE), Polyethylene (PE), Polystyrene (PS), or the like, encompassed by a cladding having compared to the tubular core a lower permittivity. Good results can be achieved by foamed PE and/or expanded PTFE or e.g., a profile with air channels as proposed in U.S. Pat. No. 4,216,449.

In the subsequent table a selection of low loss (polymer) materials is provided in an exemplary manner, including typical values for permittivity and dissipation factor. These materials and other materials having similar properties play an important role as will become apparent in more detail hereinafter.

| Low loss (polymer) materials | Permittivity | Dissipation factor |
|---|---|---|
| Foamed Polyethylene (PE foam) | 1.4 | $10 \times 10^{-5}$ |
| Expanded Polytetrafluoroethylene (E-PTFE) | 1.6 | $12 \times 10^{-5}$ |
| Polytetrafluoroethylene (PTFE) | 2.1 | $15 \times 10^{-5}$ |
| Polyethylene (PE) | 2.3 | $15 \times 10^{-5}$ |
| Polypropylene (PP) | 2.2 | $35 \times 10^{-5}$ |
| Polystyrene (PS) | 2.5 | $50 \times 10^{-5}$ |
| Polyetheretherketone (PEEK) | 3.2 | $200 \times 10^{-5}$ |
| Polyimide (PI) | 3.5 | $360 \times 10^{-5}$ |
| Liquid Cristal Polymer (LCP) | 3.1 | $410 \times 10^{-5}$ |
| Polyphenylene Sulfide (PPS) | 4.2 | $830 \times 10^{-5}$ |

To achieve the bandgap structure for more field confinement inside the tube, an inner layer with higher permittivity compared to the tubular core can be applied on the inside wall of the tubular core. Depending on the permittivity of this inner material the tube boring and layer dimensions the field confinement can be controlled as described hereinafter. An optimization process for the design of a cable according to the invention may typically comprise the following method steps:

(a) Define outer diameter $D_{2\ outer}$ of the tubular core having an effective permittivity of $\varepsilon_{r\ eff}$ (starting point for optimization): To avoid negative signal degradation by multi-mode operation the cutoff frequency of the first higher mode (TM01) should be located close to the upper frequency $f_{upper}$ of the operating band. The outer diameter can be calculated according to the following formula (+/−10%):

$$D_{2\ outer}[\text{mm}] \approx \frac{1000}{f_{upper}[\text{GHz}] * \sqrt{\varepsilon_{r\ eff.}}}$$

(b) Define inner diameter $d_{2\ inner}$ of the tubular core (starting point for optimization): To provide good guidance of the wave even at the lower frequency $f_{lower}$ of the operation band the radius the inner diameter of the tubular core should be small compared to the wavelength. The inner diameter can be calculated according to the following formula (+/−10%):

$$d_{2\ inner}[\text{mm}] \approx \frac{240}{f_{lower}[\text{GHz}] * \sqrt{\varepsilon_{r\ 3\ high.}}}$$

(c) Define layer thickness of thin high permittivity layer $\delta_3$ having a permittivity of $\varepsilon_{r\ 3\ high}$ (starting point for optimization): This layer should be thin, not to carry too much field energy. The thickness of the layer can be calculated by the following formula (+/−10%):

$$\delta_3[\text{mm}] \approx \frac{60}{f_{lower}[\text{GHz}] * \sqrt{\varepsilon_{r\ 3\ high.}}}$$

(d) Group delay optimization: Choose the cladding diameter R3 ideally 2*R2 (smaller diameter are possible but more field will leak out of the cable). Run parameter optimization to flatten group delay variation in an electromagnetic field solver.

Therefore, the outer diameter of the cable can be adjusted to the transmission properties of the application needed. Surprisingly, simulations show that this type of waveguide provide a significant better guidance of the wave allowing tighter bending radius of the cable. With a cable design according to the invention a comparable high dissipation factor of a thin high permittivity inside layer becomes almost irrelevant for the attenuation allowing to reduce cable dimensions without the penalty of significant attenuation increase caused by the dissipation factor increase in order of magnitudes above the values from PTFE, PE etc. Surprisingly, by balancing the thickness of the inner layer and the thickness of the hollow low loss dielectric tube, the waveguide dispersion can be reduced and thereby the group delay variation can be flattened over a large bandwidth: In the range of e.g. 110 GHZ to 140 GHz, the delay can be kept below 4 pico sec/m compared to about 60 pico sec/m for a conventional solid core design or about 80 pico sec/m for a conventional hollow waveguide design.

Unlike the prior art, preferred variations of the invention are based on a tubular core instead of full cross-section of low density PTFE to guide electromagnetic waves, resulting in ascending and descending dielectric constant values (from the core outwards).

Use of thin high permittivity layer for field confinement on the inside of the tubular core. The thinner the layer on the inside of the tubular core is, the less the behavior of the cable is depending on the dissipation factor of the material, since most of the field is confined and propagating in the tubular core, while only a small portion of the field is propagating in the high dissipation factor layer, thus allowing to choose freely the material concentrating on needed permittivity without having to worry about the high dissipation factor which is mostly not specified/known in this frequency range, where measurement are expensive, unprecise and unreliable.

Cables known from the prior art typically have diameters in the range of 9 to 15 millimeters. Unlike such prior art cables, improved cables according to the invention offer diameters in the range of 3.5 to 5 mm thereby keeping losses within acceptable values, depending on the field of application e.g., 3-8 dB/m. In combination with the lower bending radius it becomes possible to use a dielectric wave guide cable according to the invention in environments where cable volume is a critical factor. The minimum bending radius of the cable will be reduced in a similar factor as the cable dimension shrinks. As group-delay variation may become a limiting factor for the achievable transmission length, the cable design according to the invention may significantly improve the group delay variation by e.g., 20% bandwidth at e.g., 100 GHz from several hundred pico sec per meter to values below two pico sec per meter cable length.

Depending on the field of application, a foamed cladding material can be used on the inside of the cable instead of air or other gases, e.g., an extruded profile and/or a PTFE foil wrapped as proposed in EP0304141. Alternatively or in addition, a conductive jacket may help to hinder field strength leaking out of the cable. Alternatively or in addition, a jacket made from a resistive material, such as e.g., carbon filled polymer, etc. may be used as jacket material.

The number of layers altering higher and lower permittivity may be further increased, possibly resulting in even better performance (increased bandwidth, more field confinement, flatter group delay). A gradually permittivity variation instead of discrete steps may work as well.

Instead of a circular cross section, any other form may be applied (e.g., rectangular, polygonal, etc.). The high permittivity layer may e.g., be realized by co-extrusion of a polymer material with the tubular core, by a coating process or any other state of the art inner layer building methods. Applicable materials could be e.g., glass or ceramic as wrapped foil, woven material or grinded powder with or without thermoplastic, duroplastic, pasty fillers or liquids.

In a preferred variation, a dielectric wave guide cable according to the invention normally comprises a tubular core made from a first material having a first permittivity. The tubular core is directly or indirectly encompassed by a cladding having, compared to the tubular core, a second permittivity which is lower than the first permittivity. In addition, the tubular core comprises on the inside an inner layer having a third permittivity which is higher than the first permittivity. The inner layer is preferably arranged in the form of a coating along an inner wall. Good results can be achieved when the tubular core, the inner layer and/or the gladding are co-extruded. Good results can be achieved wen the first material has a dissipation factor in the range of $5\times10^{-5}$ to $40\times10^{-5}$. The cladding can be made from a second material having a lower permittivity then the first material. The inner layer can be made from a third material having a higher permittivity then the first material. Good results can be achieved, when the cladding is made from foamed first material. The cladding can be made from foamed polyethylene and/or expanded polytetrafluoroethylene. The inner layer can be made from the first material and comprising a filler having a higher permittivity then the first material. Filler material can be e.g., at least one out of the group of: alumina (aluminum oxide), fused quartz, fused silica, boron nitride, sapphire, magnesium oxide. When at least one filler material is added in the volume amount of 0.1% to 40% in the form of powder the melting temperature of the compound is not significantly different then the melting temperature of the first material. This is a significant advantage during production, e.g., by co-extrusion. Good results can be achieved when the tubular core has an inner diameter in the range of 0.5 to 2.0, more preferably 0.7 to 1.5, most preferably 1.0, with respect to the wavelength of the free progressive wave. Depending on the field of application the cladding can be encompassed by a protective jacket. If appropriate, the cladding can be coated on the outside by a coating made from a conductive material.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts throughout the detailed description of the drawings. The x-y-z scale shown in certain drawings is intended to show three axes of measurement as understood to those having ordinary skill in the art.

Figure 1:
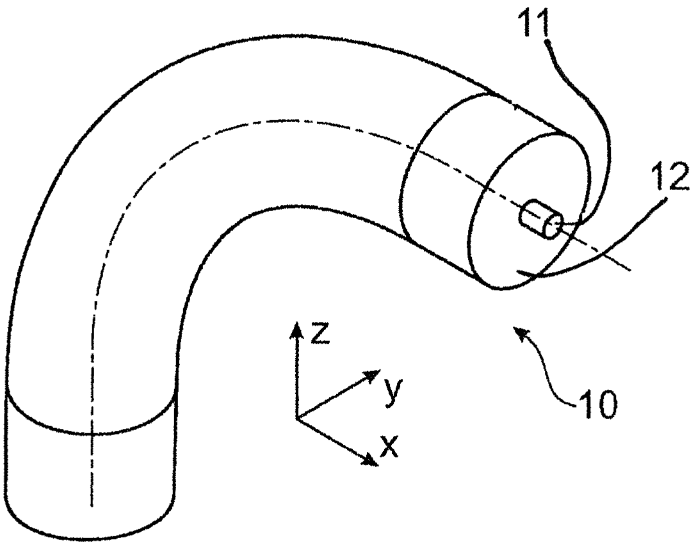
Fig. 1 (prior art)
FIG. 1 is a dielectric waveguide cable according to the prior art.
Figure 4:
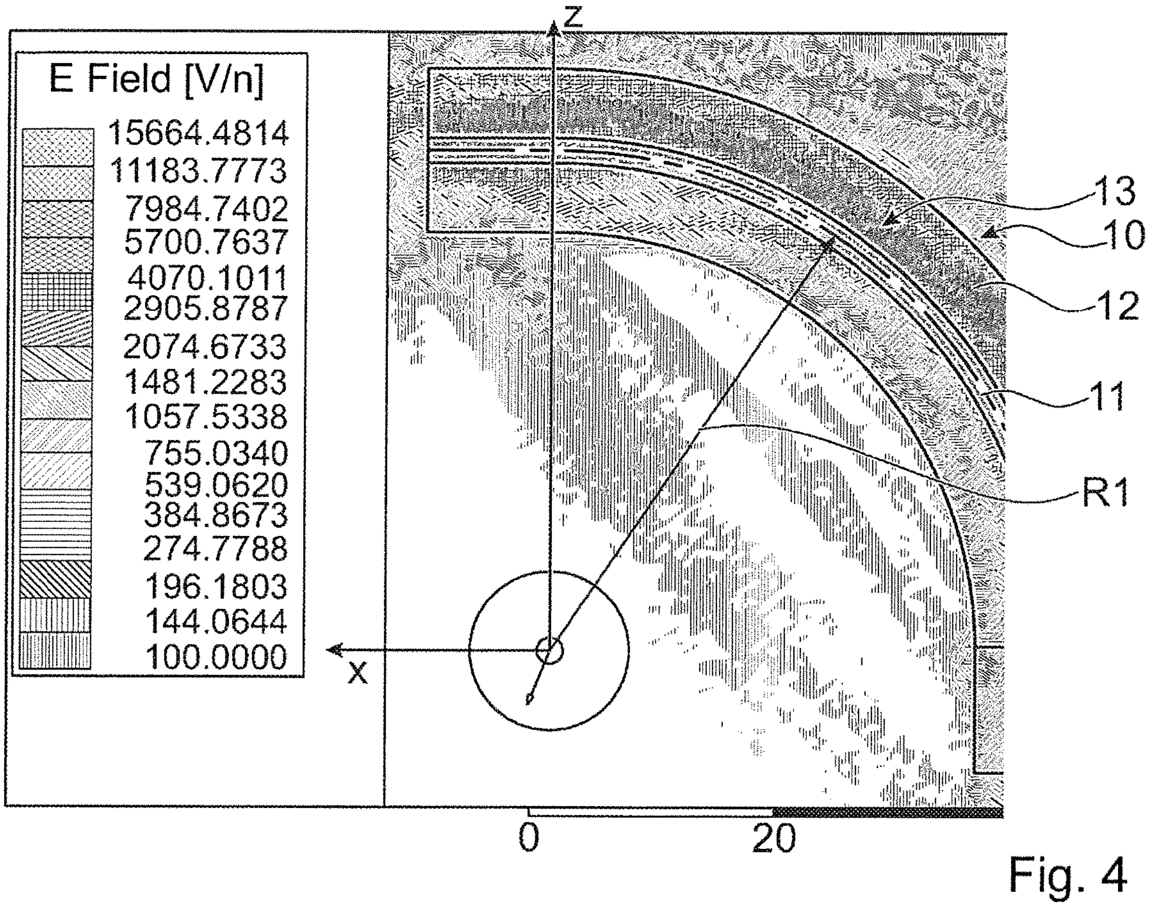
Fig. 4 PRIOR ART
FIG. 4 is a diagram showing the transmission behavior of cable according to FIG. 1.

FIG. 1 shows a dielectric waveguide cable 10 according to the prior art. The cable comprises a core 11 and a jacket 12 surrounding the core 11. FIG. 4 is showing the transmission behavior of the cable 10 according to the prior art when bent at a radius (R1) of 40 mm. As it can be seen, the signal is deviating from the center axis of the core 11 in an uncontrolled manner.

Figure 2:
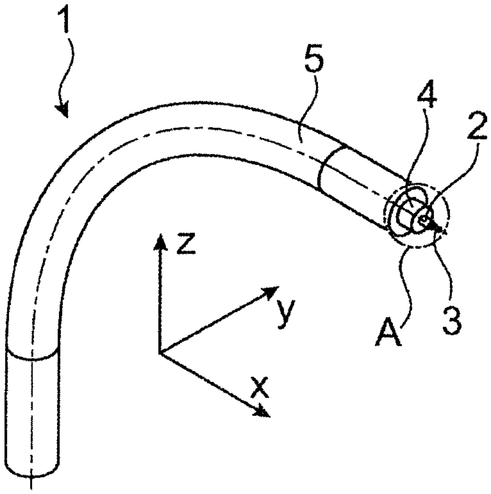
FIG. 2 is a section of a dielectric waveguide cable according to the invention in a perspective.
Figure 3:
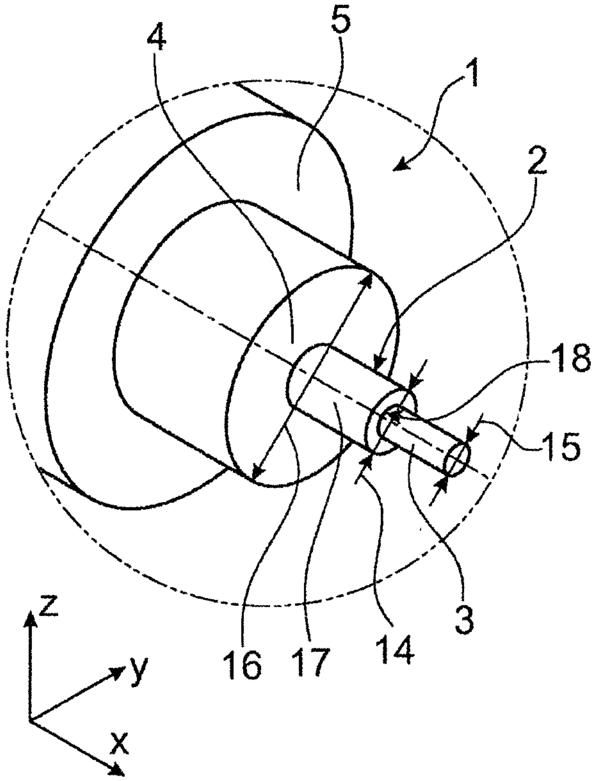
FIG. 3 shows detail A of FIG. 2.

FIG. 2 is showing a section of a dielectric waveguide cable 1 according to the invention in bend manner. FIG. 3 is showing detail A of FIG. 2 in an enlarged view. The dielectric wave guide cable 1 comprises a tubular core 2 made from a first material (low loss material) as e.g., described herein above having a certain permittivity. The tubular core 2 has an outer diameter 14 defined by an outer wall 17 and an inner diameter 15 defined by an inner wall 18, as shown in FIG. 3. The inner wall 17 and the outer wall 18 are preferably arranged concentric with respect to each other.

The tubular core is encompassed by a cladding 4 having, compared to the tubular core 2, a lower permittivity, e.g., due to material and/or geometry. The cladding 4 is preferably arranged concentric with respect to the tubular core.

The cladding 4 can be made from foamed polyethylene and/or expanded polytetrafluoroethylene or the like.

Depending on the field of application the tubular core 2 has in the case of a circular cross section preferably an inner diameter ($D_{2\ inner}$) in the range of:

$$D_{2\ inner}[\text{mm}] \approx \frac{240}{f_{lower}[\text{GHz}] * \sqrt{\varepsilon_{r\ 3\ high}}},$$

and an outer diameter ($D_{2\ outer}$) in the range of:

$$D_{2\ outer}[\text{mm}] \approx \frac{1000}{f_{upper}[\text{GHz}] * \sqrt{\varepsilon_{r\ eff}}}.$$

Wherein f=frequency and ε=permittivity as used throughout the subject specification. Although circular cross section cladding 4 may be made of a polymer containing conductive material like metal particles or carbon.

The tubular core 2 normally comprises on the inside an inner layer 3, e.g., in the form of a coating and/or a coextruded layer, having a higher permittivity compared to the first material of the tubular core 2. Good results can be achieved when the inner layer 3 has a thickness ($\delta_3$) in the range of:

$$\delta_3[\text{mm}] \approx \frac{60}{f_{lower}[\text{GHz}] * \sqrt{\varepsilon_{r\ 3\ high}}}.$$

In the subsequent table a selection of electrical performance (e.g., loss, group delay), material properties (e.g. $\varepsilon_r$, tan delta) and dimensions for the tubular core (2), inner layer (3) and cladding (4) are provided for embodiments of dielectric waveguide cables:

| No. | Electrical performance | Tubular core (2) | Inner layer (3) | Cladding (4) |
|---|---|---|---|---|
| 1 | Loss: 4.9 dB/m @140 GHz group delay variation: 0.8 ps/m @110 . . . 140 GHz | PTFE; Er = 2.1; tan delta = 10 × $10^{-5}$ $D_{2outer}$ = 2.6 mm $D_{2outer}$ = 1.0 mm | Polystyrene Er = 2.5 tan delta = 100 × $10^{-5}$ Thickness $\delta_3$ = 0.245 | PE-foam Er = 1.5 tan delta = 13 × $10^{-5}$ $D_{4outer}$ = 4.6 mm |
| 2 | Loss: 4.4 dB/m @ 140 GHz group delay variation: 3.1 ps/m @110 . . . 140 GHz | PTFE; Er = 2.1; tan delta = 10 × $10^{-5}$; $D_{2outer}$ = 2.6 mm $D_{2outer}$ = 0.8 mm | Polyphenylensulfid Er = 2.8 tan delta = 100 × $10^{-5}$ Thickness $\delta_3$ = 0.2 | PE-foam Er = 1.5 tan delta = 13 × $10^{-5}$ $D_{4outer}$ = 4.6 mm |
| 3 | Loss: 4.6 dB/m @140 GHz group delay variation: 1.5 ps/m @110 . . . 140 GHz | PTFE; Er = 2.1; tan delta = 10 × $10^{-5}$ $D_{2outer}$ = 2.2 mm $D_{2outer}$ = 0.6 mm | Polyetheretheketone Er = 3.2 tan delta = 100 × $10^{-5}$ Thickness $\delta_3$ = 0.15 | PE-foam Er = 1.5 tan delta = 13 × $10^{-5}$ $D_{4outer}$ = 4.6 mm |
| 4 | Loss: 15 dB/m @140 GHz group delay variation: 3.2 ps/m @110 . . . 140 GHz | PTFE; Er = 2.1; tan delta = 10 × $10^{-5}$ $D_{2outer}$ = 2.6 mm $D_{2outer}$ = 0.8 mm | Polyetheretheketone Er = 3.2 tan delta = 100 × $10^{-5}$ Thickness $\delta_3$ = 0.25 | PE-foam Er = 1.5 tan delta = 13 × $10^{-5}$ $D_{4outer}$ = 3.6 mm |
| 5 | Loss: 5 dB/in @140 GHz group delay variation: 2.8 ps/m @110 . . . 140 GHz | PE; Er = 2.3; tan delta = 5 × $10^{-5}$ $D_{2outer}$ = 2.0 mm $D_{2outer}$ = 0.6 mm | Polyetheretheketone Er = 3.2 tan delta = 100 × $10^{-5}$ Thickness $\delta_3$ = 0.15 | PE-foam Er = 1.5 tan delta = 13 × $10^{-5}$ $D_{4outer}$ = 3.6 mm |

would serve best for preferred circular polarization transmission, other functionally similar polygonal cross section (e.g., square or hexagonal) may be chosen for production reasons e.g., to combine multiple waveguide cores in one cable. In this case the dimension should be chosen in that way, that the area of the cross section is in the similar range than the circular one. The outer diameter ($D_4$) identified in FIG. 3 as element 16 of the cladding 4 preferably is in the range of:

$$D_4[\text{mm}] \approx \frac{2000}{f_{upper}[\text{GHz}] * \sqrt{\varepsilon_{r\ eff}}}.$$

If appropriate, the cladding 4 can be encompassed directly or indirectly by a protective jacket 5. Furthermore, the FIG. 4 is schematically indicating the distribution of an electric field 13 with differing values as indicated in the legend box for the dielectric wave guide 10 as shown in FIG. 1. The dielectric wave guide 10 is bend by a radius R1 which in the shown pictures is 40 mm.

Figure 5:
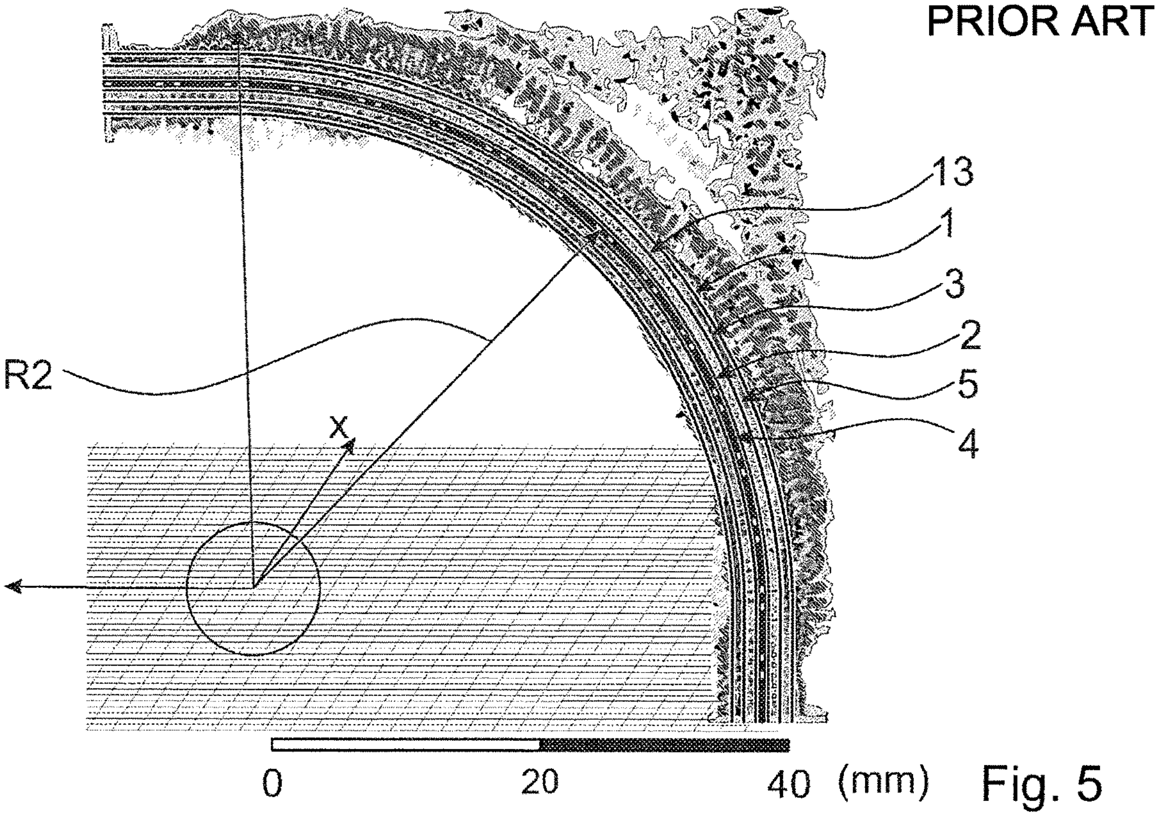
FIG. 5 is a diagram showing the transmission behavior of cable according to FIG. 2.

FIG. 5 is schematically indicating the field the distribution of the electric field 13 in the dielectric wave guide 1 according to the invention as shown in FIG. 2. The dielectric wave guide 1 is bend by a radius R2 which in the shown pictures is 40 mm.

Rather, the words used in the specification are words of description rather than limitation, and it is understood that various changes may be made without departing from the spirit and scope of the invention.

The invention claimed is:

1. A dielectric wave guide cable (1), adapted for a frequency range of 110 to 140 GHZ, comprising:

a tubular core (2) made from a first material having a first permittivity, encompassed by a cladding (4) having, compared to the tubular core (2), a second permittivity which is lower than the first permittivity wherein the tubular core (2) comprises on an inside wall thereof, an inner layer (3) having a third permittivity which is higher than the first permittivity, wherein the inner layer (3) comprises a coating providing a bandgap structure for field confinement within the tubular core.

2. The dielectric wave guide cable (1) according to claim 1, wherein the first material has a dissipation factor in the range of $5\times10^{-5}$ to $40\times10^{-5}$.

3. The dielectric wave guide cable (1) according to claim 1, wherein the cladding (4) is made from a second material having a lower permittivity than the first material.

4. The dielectric wave guide cable (1) according to claim 3, wherein the inner layer (3) is made from a third material having a higher permittivity than the first material.

5. The dielectric wave guide cable (1) according to claim 1, wherein the cladding (4) is made from foamed first material.

6. The dielectric wave guide cable (1) according to claim 1, wherein the cladding (4) is made from foamed polyethylene and/or expanded polytetrafluoroethylene.

7. The dielectric wave guide cable (1) according to claim 1, wherein the inner layer (3) is made from the first material and comprises a filler having a higher permittivity than the first material.

8. The dielectric wave guide cable (1) according to claim 1, wherein the tubular core (2) has an inner diameter in the range 0.5 to 2.0 with respect to the wavelength of a free progressive wave.

9. The dielectric wave guide cable (1) according to claim 1, wherein the cladding (4) is encompassed by a protective jacket (5).

10. The dielectric wave guide cable (1) according to claim 1, wherein the cladding (4) is coated on an outside wall thereof by a coating made from a conductive material.

11. The dielectric wave guide cable (1) according to claim 1, wherein the inner layer (3) has a thickness calculated according to the formula (wherein $f_{lower}$ is the lower operating frequency and $\varepsilon_{r\ 3\ high}$ is the permittivity of the inner layer):

$$\approx \frac{60}{f_{lower}[\text{GHz}] * \sqrt{\varepsilon_{r\ 3\ high.}}}.$$

12. The dielectric wave guide cable (1) according to claim 1, wherein the tubular core (2) has a circular cross section or a polygonal cross section.

13. The dielectric wave guide cable (1) according to claim 1, wherein the cladding (4) has a circular or polygonal cross section.

14. The dielectric wave guide cable (1) according to claim 1, wherein the inner layer (3) is made from a third material having a higher permittivity than the first material.

15. The dielectric wave guide cable (1) according to claim 1, wherein the coating comprises a coextruded coating.

* * * * *